March 29, 1966     F. FRIER     3,243,678
MOTOR CONTROL SYSTEM
Filed Aug. 13, 1962     2 Sheets-Sheet 1

INVENTOR.
Frank Frier
BY C. R. Meland
His Attorney

March 29, 1966 F. FRIER 3,243,678
MOTOR CONTROL SYSTEM
Filed Aug. 13, 1962 2 Sheets-Sheet 2

INVENTOR.
Frank Frier
BY C.R. Meland
His Attorney

United States Patent Office 3,243,678
Patented Mar. 29, 1966

3,243,678
MOTOR CONTROL SYSTEM
Frank Frier, Anderson, Ind., assignor to General Motors Corporation, Detroit, Mich., a corporation of Delaware
Filed Aug. 13, 1962, Ser. No. 216,523
9 Claims. (Cl. 318—139)

This invention relates to a motor control system and more particularly to a control system for a motor that drives a vehicle such as a golf car.

One of the objects of this invention is to provide a motor control system wherein the electric motor is supplied with power from at least two batteries and wherein means are provided for connecting the batteries in series or in parallel with the motor and for changing the field connections of the motor all under the control of a manually operable actuator such as an accelerator pedal.

A further object of this invention is to provide a motor control system for a vehicle such as a golf car which is operative to provide a plurality of output speeds by varying the field connections of the motor and by varying the voltage applied to the motor, the system including centrifugal switch means for maintaining a certain combination of switch settings when the vehicle is traveling on level ground and a different combination of switch settings when it is climbing a hill.

Another object of this invention is to provide a motor control system for a golf car or the like which is operative to provide a plurality of output speeds under the control of a manual actuator such as an accelerator pedal and which is operative to provide automatic control when the accelerator pedal is fully depressed. In this arrangement, the manually operable actuator controls a plurality of switches but when the accelerator is fully depressed, a centrifugal switch is used to provide automatic control.

Further objects and advantages of the present invention will be apparent from the following description, reference being had to the accompanying drawings wherein preferred embodiments of the present invention are clearly shown.

Figure 1:
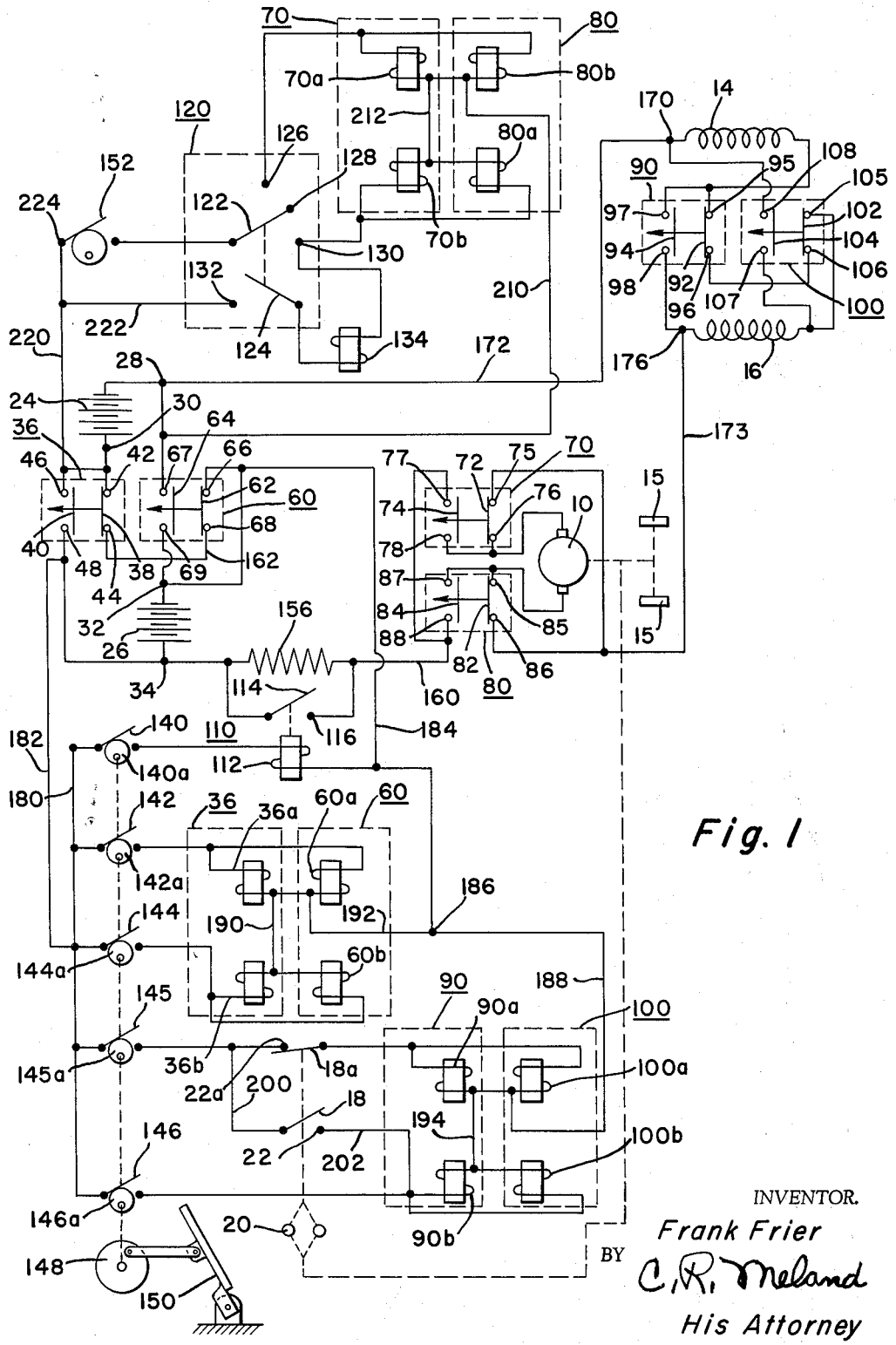
FIGURE 1 is a schematic circuit diagram of a motor control system made in accordance with this invention.

Referring now to the drawings and more particularly to FIGURE 1, a D.C. motor is illustrated which has an armature 10 and field windings 14 and 16. In the actual physical construction of this motor, there may be four field windings but for purposes of illustration, only two field windings are shown, it being understood that the two field windings shown could represent the four field windings described above.

The armature 10 of the motor drives the wheels 15 of a vehicle which may be, for example, a golf car that is used to transport golf players around a golf course. The wheels 15 are connected with the armature by any suitable power transmitting means and this power transmitting means drives a centrifugal switch having shiftable contactors 18 and 18a and fly weights 20 for shifting the contactors 18 and 18a. The centrifugal switch may be designed such that contactor 18 is disengaged from contact 22 and contact 18a is engaged with fixed contact 22a when the vehicle is moving at less than nine m.p.h. When nine m.p.h. is exceeded, contact 18a opens and contact 18 closes. It will be appreciated that this speed is given by way of example and not by way of limitation and that other speeds could be selected by suitable design for the centrifugal switch.

The electric motor and the control system of this invention are powered from batteries 24 and 26 which may be, for example, 18 volt batteries. The negative side of battery 24 is connected with junction 28 whereas the positive side of this battery is connected with junction 30. The negative side of battery 26 is connected with junction 32 while the positive side of this battery is connected with junction 34.

Figure 2:
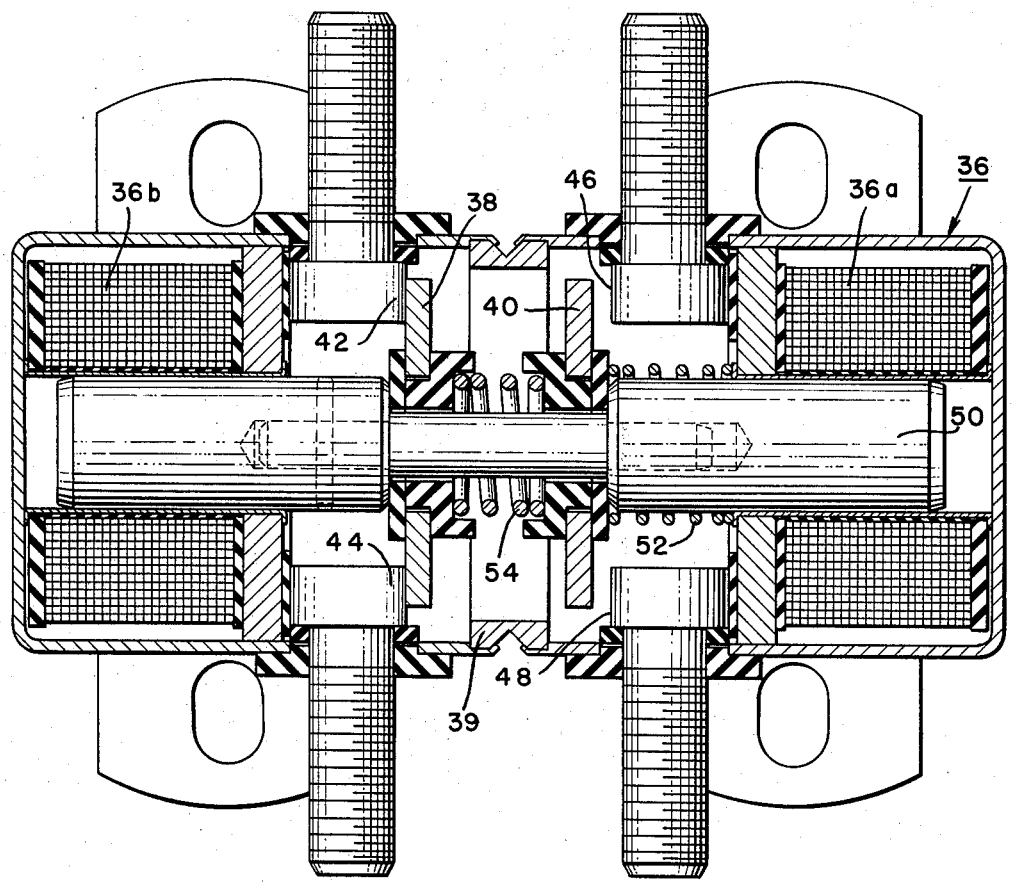
FIGURE 2 is a sectional view of a magnetic switch which is used in several places in the system shown in FIGURE 1.

The control system of this invention employs a plurality of double acting magnetic switches, one of which is shown in the sectional view of FIGURE 2. Thus, the control system of FIGURE 1 has a magnetic switch 36 which includes shiftable contactors 38 and 40. These contactors cooperate respectively with fixed contacts 42 and 44 and 46 and 48 which take the form of studs as is illustrated in FIGURE 2. In FIGURE 2, it is seen that the contactors 40 and 38 are carried by insulators on the armature 50 and the insulators are biased into engagement with shoulders on the armature by an over travel spring 54. This magnetic switch includes the coil windings 36a and 36b which are illustrated schematically in FIGURE 1. These coil windings are encased in magnetic metal cans which are secured together by being crimped on to the annular part 39. The magnetic switch is designed such that contactor 38 normally engages fixed contacts 42 and 44 and the armature is urged in this direction by a relatively light spring 52. The contactors 38 and 40 are, of course, insulated from the armature 50 and this armature is made in three pieces as shown. It will be appreciated that the armature can be made in two pieces that are pinned together if so desired.

When coil winding 36b is energized, the contactor 38 is held sealed against the fixed contacts 42 and 44 and is also urged in this direction by the spring 52. When coil winding 36a is energized, the contactor 40 is moved into engagement with contacts 46 and 48 while the contactor 38 moves away from fixed contacts 42 and 44. It thus is seen that whenever coil winding 36b is energized, the normal position of the contacts shown in FIGURES 1 and 2 is not disturbed but the contactor 38 is magnetically held against fixed contacts 42 and 44 so that this circuit will not open in the event that the golf car drives over rough bumps on the golf course. There are five other magnetic switches shown in FIGURE 1 which are to be described and which are the same as the one shown in FIGURE 2. In each magnetic switch, one of the movable contacts leaves its associated fixed contacts before the other movable contact engages its associated fixed contacts when the armature 50 shifts from one position to another.

The second magnetic switch is generally designated by reference numeral 60 and this switch is of the double acting type shown in FIGURE 2 and has coil windings 60a and 60b. In addition, this magnetic switch has contactors 62 and 64 which cooperate respectively with fixed contacts 66 and 68 and 67 and 69. When coil winding 60a is energized, the contactor 64 will shift into engagement with fixed contacts 67 and 69 and the contactor 66 will shift out of engagement with fixed contacts 66 and 68. With coil winding 60b energized, the switch contactors 62 and 64 remain in their position shown in FIGURE 1.

The other magnetic switches include magnetic switch 70 having contactors 72 and 74 and opposed coil windings 70a and 70b. When coil winding 70b is energized, the contactors 72 and 74 remain in their position illustrated in FIGURE 1. The fixed contacts for magnetic switch 70 are designated by reference numerals 75, 76, 77 and 78.

The magnetic switch 80 includes coil windings 80a and 80b, together with contactors 82 and 84 which cooperate with fixed contacts 85, 86, 87 and 88. When coil winding 80b is energized, the contactors 82 and 84 remain in their position illustrated in FIGURE 1. Energization of coil winding 80a causes the contactors 82 and 84 to shift.

Magnetic switch 90 has opposed coil windings 90a and 90b, the shiftable contactors 92 and 94, and fixed contacts 95, 96, 97 and 98. When coil winding 90a is energized, contactor 94 shifts into engagement with fixed contacts 97 and 98 and contactor 92 shifts out of engagement with fixed contacts 95 and 96. When coil winding 90b is energized, the contactors 92 and 94 remain in the position shown in FIGURE 1 with the contactor 92 being maintained sealed against the fixed contacts 95 and 96.

The magnetic switch 100 includes coil windings 100a and 100b, the shiftable contactors 102 and 104, and fixed contacts 105, 106, 107 and 108. When coil winding 100a is energized, the contactors 102 and 104 are moved leftwardly such that contactor 104 engages fixed contacts 107 and 108 while contactor 102 leaves fixed contactors 105 and 106. When coil winding 100b is energized, the contactors 102 and 104 remain in their position shown in FIGURE 1 but the contactor 102 is held sealed against the contacts 105 and 106.

The control system of this invention includes another magnetic switch which has only one coil winding. This magnetic switch is generally designated by reference numeral 110 and includes the coil winding 112 and the shiftable contactor 114. The shiftable contactor 114 is normally out of engagement with fixed contact 116 but will be pulled into engagement with this fixed contact when the coil winding 112 is energized.

The system of this invention includes a key switch which is generally designated by reference numeral 120. The key switch 120 has movable contactors 122 and 124 which are ganged together. The movable contactor 122 can shift between a fixed contact 126, a position 128 and fixed contact 130. The movable contactor 124 can engage the fixed contact 132. The key switch 120 controls the direction of movement of the golf car or in other words, selects whether the golf car will move forward or backward. In the forward position, contactor 122 engages the fixed contact 126 while contactor 124 is then disengaged from all fixed contacts. In the reverse position of the switch 120, the contactor 124 engages fixed contact 132 while the contactor 122 engages the fixed contact 130. A buzzer 134 is connected between the fixed contact 130 and the shiftable contactor 124.

The manual speed control for the control system of this invention includes a plurality of switch means 140, 142, 144, 145 and 146. These switch means are moved to a closed and open position in a predetermined sequence by any suitable mechanical means. In the schematic diagram of FIGURE 1, this mechanical means takes the form of cams 140a, 142a, 144a, 145a and 146a. The cams 140a through 146a are operated by a wheel 148 which is mechanically coupled with an accelerator pedal 150.

The sequence of operation is such that when the accelerator pedal 150 is not depressed, all of the switches 140 through 146 are open. As the accelerator is depressed, the switches 142 and 146 are closed first and switches 140, 144 and 145 remain open. After these switches are closed, a cam operated switch 152 is also closed and remains closed during further depression or actuation of the accelerator pedal 150. When switches 142, 146 and 152 are closed, the control system is in a "start" position. With further depression of the accelerator pedal, a first speed position is reached wherein switches 142, 146 and 140 are closed and switches 144 and 145 are open. Further depression of the accelerator pedal causes a second speed position to be reached wherein switches 142, 145 and 140 are closed and switches 144 and 146 are open. A still further depression of the accelerator pedal causes a third speed position to be reached wherein switches 144, 146 and 140 are closed and switches 142 and 145 are open. When the accelerator pedal is fully depressed, a fourth speed position is attained wherein switches 144, 145 and 140 are closed and switches 146 and 142 are open. In this speed position, there is automatic control which is to be more fully described hereinafter. Although the switches 140, 142, 144, 145 and 146 are shown as cam controlled, they may be built into a single unit switching mechanism having a single shiftable actuator. As one example, this unit could take the form of an annular fixed conductor connected with spaced conductive rivets that are radially spaced from a plurality of circumferentially spaced fixed contacts located on a circle around the annular conductor. There may be, for example, six fixed contacts and three circumferentially spaced movable contacts mounted on a rotary member that selectively connects the rivet heads connected to the annular fixed conductor with the six fixed contacts. The annular conductor would then be connected with conductor 182 and the three shiftable contactors would then selectively make a circuit between conductor 182 and the conductors shown schematically connected between switches 140, 142, 144, 145 and 146 and the circuits that they feed. The conductor 180 in such a case would be equivalent to the fixed annular conductor.

The junction 34 is connected with the positive terminal of battery 26 and is connected to one side of a resistor 156 and to one side of the relay contactor 114. The resistor 156 has a positive temperature coefficient of resistance such that its resistance will increase rapidly when current is passing therethrough for an extended period of time. As will become more readily apparent hereinafter, this resistor will cause the golf cart to stall if the operator of the golf cart sets the accelerator 150 in its "start" position for too long a period of time. The opposite side of resistor 156 is connected with the fixed contact 88 of magnetic switch 80 and with the fixed contact 77 of magnetic switch 70 both via the lead wire 160.

The junction 32 which is connected with the negative side of the battery 26 is connected with the fixed contacts 66 and 69 of magnetic switch 60. A lead wire 162 connects the fixed contact 68 of magnetic switch 60 with the fixed contact 44 of the magnetic switch 36.

The fixed contacts 42 and 46 of magnetic switch 36 are connected together while the fixed contact 48 of magnetic switch 36 is connected with junction 34 and thus to the positive side of battery 26.

The negative side of battery 24 is connected with junction 28 and this junction is connected with junction 170 via the lead wire 172. The junction 28 is also connected with the fixed contact 67 of magnetic switch 60. It is seen that the junction 170 is connected to one side of field winding 14 and to the fixed contact 108 of magnetic switch 100. The opposite side of field winding 14 is connected with the fixed contacts 95 and 97 of magnetic switch 90.

One side of the field winding 16 is connected with a junction 176. This junction is connected with fixed contacts 75, 86 and 98 of magnetic switches 70, 80 and 90. The opposite side of field winding 16 is connected with the fixed contacts 105 and 107 of the magnetic switch 100. The fixed contact 96 of magnetic switch 90 is connected with the fixed contact 106 of magnetic switch 100.

One side of the switches 140 through 146 are fed from a conductor 180 which is connected with conductor 182. The conductor 192 is connected with the positive side of battery 26. The relay coil 112 is connected between switch 140 and a conductor 184. The conductor 184 is connected with the negative side of battery 26. It is seen that lead wire 184 is connected with junction 186 and that this lead wire feeds a lead wire 188. The relay coils 36a and 60a are connected between switch 142 and the junction 186. The relay coils 36b and 60b are connected between switch 144 and junction 186 via the lead wires 190 and 192.

The relay coils 90a and 100a are connected between switches 145 and 18a and the lead wire 188. The relay coils 90b and 100b are connected between switch 146 and lead wire 188 via lead wire 194. The relay coils 90b and 100b can also be energized through switch 145 when the centrifugal switch contactor 18 is closed through a circuit that includes lead wires 200 and 202.

One side of relay coils 70a and 80b are connected with the negative side of battery 24 via lead wire 210. One side of relay coils 70b and 80a are likewise connected with lead wire 210 through the lead wire 212. The opposite side of relay coils 70a and 80b are connected with fixed contact 126 of switch 120. The opposite side of relay coils 70b and 80a are connected with the fixed contact 130 of switch 120.

The contactor 122 of switch 120 is connected to one side of switch 152, the opposite side of this switch being connected with the lead wire 220 which goes to the positive side of battery 24. A conductor 222 connects the junction 224 with the fixed contact 132 of switch 120.

The operation of the control system of this invention will now be described. Assuming that the operator desires to move in a forward direction, the key switch 120 is actuated such that contactor 122 will engage the fixed contact 126 while contactor 124 will not be engaged with any of the fixed contacts. With contactor 122 engaging the fixed contact 126, the relay coils 70a and 80b will be energized when the manually operable switch 152 is closed. The manually operable switch 152 is closed as soon as the accelerator pedal 150 is depressed sufficiently to cause contacts 142 and 146 to close. The relay coils 70a and 80b will be energized from a circuit that can be traced from the positive side of battery 24 through lead wire 220, through the closed switch 152, through contactor 122 to contact 126, through the relay coils 70a and 80b and then through the lead wire 210 to the negative side of battery 24.

With relay coils 70a and 80b energized, the contactors 72 and 74 are shifted from their position illustrated in FIGURE 1 to a position wherein the contactor 74 connects contacts 77 and 78 after contactor 72 leaves fixed contacts 75 and 76. The energization of relay coil 80b will not disturb the connection of contactors 82 and 84.

When switch 142 closes, the relay coils 36a and 60a will be energized across the battery 26 and this will cause the contacts 38 and 40 to shift as well as the contacts 62 and 64 of the magnetic switch 60. The closing of switch 146 causes the coils 90b and 100b to be energized but their contactors are not shifted.

The energization of the relay coils 70a and 80b connects the armature 10 with the power conductors 160 and 172 in such a manner that the motor will be driven in a direction to provide forward motion for the golf car. It thus can be seen that the magnetic switches 70 and 80 are effective to control the direction of current flow through the armature 10 and thus can control the direction of rotation of the motor.

The energization of relay coils 36a and 60a operates the magnetic switches 36 and 60 such that the batteries 24 and 26 are connected in parallel. It thus can be seen that magnetic switches 36 and 60 control the connection of the batteries 24 and 26.

The energization of relay coils 90b and 100b controls the connection of the field windings 14 and 16 with the power supply conductors 172 and 173. When relay coils 90b and 100b are energized, the field windings 14 and 16 are maintained in a series connection since the contactors of magnetic switches 90 and 100 are not shifted from their position shown in FIGURE 1. The series connection of the field windings 14 and 16 is the low speed connection for the field windings and these field windings are alternately connected in parallel to provide the high speed connection.

In summary, it can be seen that in the "start" position of the accelerator pedal 150, the batteries are connected in parallel, the motor field windings 14 and 16 are connected in series and the direction of current flow through the armature 10 is such to provide for forward movement of the golf car.

If the operator does not depress the accelerator pedal 150 sufficiently to move into the first speed position, the golf car will eventually stall. This is caused by the resistor 156 increasing its resistance to the point where the motor stalls. Thus, as current continues to flow through the resistor and since the resistor has a positive temperature coefficient of resistance, its resistance will increase sharply and will stall the motor if the accelerator is not shifted from its "start" position.

When the accelerator pedal is depressed sufficiently to move from its "start" position to a first output speed position, the contacts 142 and 146 remain closed but the contact 140 is then closed. When contact 140 closes, the relay coil 112 is energized causing the contactor 114 to close. This shorts the resistor 156 and provides a voltage to the motor which is equal to 18 volts. The low speed or series connection for the motor fields is maintained in the first speed position and the batteries remain connected in parallel. It thus is seen that the only difference between the first speed position and the start position is the short circuiting of the resistor 156.

As the accelerator pedal 150 is further depressed, the second speed position is reached wherein contactor 142 remains closed, contactor 140 remains closed while contactor 145 is now closed and contactors 144 and 146 are open. Since contactor 140 is closed, the resistor 156 is still short circuited. With contactor 142 still closed, the batteries still remain in their parallel connection. The closing of contactor 145 will provide an energization path for relay coils 90a and 100a. This causes the contactors 92 and 94 and 102 and 104 to shift and the fields 14 and 16 are now connected in parallel or are connected in their high speed connection. The motor now operates with 18 volts with the batteries connected in parallel and with the motor windings in a parallel high speed connection.

A further depression of the accelerator pedal 150 causes the control circuit to shift from its second speed to its third output speed. For the third output speed, the contacts 140, 144 and 146 are closed while the contacts 142 and 145 are open. Since contact 140 is closed, the resistor 150 is still short circuited. The closure of contactor 144 causes the relay coils 36b and 60b to be energized while the opening of contactor 142 prevents the energization of coils 36a and 60a. This energization of magnetic switches 36 and 60 causes the battery to be shifted from a parallel connection to a series connection so that 36 volts is now supplied to the motor. The closure of contactor 146 and the opening of contactor 145 causes relay coils 90b and 100b to be energized while coils 90a and 100a are not energized. This causes the motor fields 14 and 16 to be connected in series for the low output speed connection. This means that the motor in the third speed position is energized with 36 volts but with the field windings of the motor connected for low output speed or in series.

The fourth speed connection is attained when contacts 140, 144 and 145 are closed and contacts 142 and 146 are open. Since contact 140 is closed, the resistor 156 remains short circuited. The closure of contact 144 and the opening of contactor 142 causes the batteries to be connected in series to provide 36 volts for the motor. The closure of contact 145 energizes the relay coils 90a and 100a to connect the motor fields in parallel for high speed output. In this fourth speed position, there is an automatic control which is provided by the centrifugal switch 22. Thus, with the accelerator 150 fully depressed for the fourth speed position, the contact 18 will close and the contact 18a will open when the speed of the vehicle reaches approximately nine m.p.h. When centrifugal switch contact 18 closes, the relay coils 90b and 100b are energized. The opening of contact 18a de-energizes the relay coils 90a and 100a. This causes the motor fields to be connected in series to slow down the motor and when the speed drops below nine m.p.h., the centrifugal switch contactor 18 will open and contactor 18a will close and the motor fields will then be connected in parallel. The centrifugal switch in the fourth speed position thus operates to change the field connections of the motor. It will be appreciated that as the vehicle climbs a hill and slows down, the centrifugal switch contact 18 is open and 18a is closed so that the motor fields will be connected in parallel for high speed operation.

The key switch 120 can be operated such that the golf car will move in a reverse direction. This is accomplished by shifting the contactor 122 to a position where it engages the fixed contact 130 and in addition, the contactor 124 is shifted to a position where is engages the fixed contact 132. When the contact 124 engages the fixed contact 132, the circuit for the buzzer 134 is energized so that a warning is given to the operator that the vehicle will now move in a reverse direction. When the key switch 120 is in the reverse position, relay coils 70a and 80b are not energized but the relay coils 70b and 80a are energized. This causes contacts 82 and 84 to shift while contacts 72 and 74 remain in their position shown in FIGURE 1. This reverses the direction of current flow through the armature 10 while maintaining the same direction of current flow from the motor fields 14 and 16 so that the direction of rotation of the motor is reversed. If the accelerator pedal is now depressed, the same speeds will be attained in a reverse direction as where attained in the forward direction previously described.

It is pointed out that when the key switch 120 is in its reverse position, the buzzer circuit is made from conductor 222, contactors 132 and 124, buzzer 134, contact 130, coils 70b and 80a in parallel and conductor 210. As soon as switch 152 is closed, the buzzer is short circuited by switch 152 and contactors 122 and 130. Full voltage is now applied to coils 70b and 80a to cause them to close their contacts.

While the embodiments of the present invention as herein disclosed, constitute a preferred form, it is to be understood that other forms might be adopted.

What is claimed is as follows:

1. In combination, first and second sources of direct current, a D.C. motor having an armature and at least two field windings, first magnetic switch means for connecting said sources of direct current in series or in parallel with conductors for feeding said motor, second magnetic switch means for connecting the field windings of said motor in series or in parallel, a plurality of manually operable switches connected with said first and second magnetic switch means for controlling the operation of said first and second magnetic switch means in a predetermined sequence, and means operable in one position of said manually operable switches for controlling the energization of said second magnetic switch means in response to the speed of said motor.

2. In combination, first and second batteries, a D.C. motor having an armature and first and second field windings, first magnetic switch means connected with said batteries and for connecting said batteries in series or in parallel with conductors for feeding said motor, second magnetic switch means controlling the direction of current flow through the armature of said motor, third magnetic switch means for connecting said field windings in series or in parallel with said batteries, manually operable switch means operated in a predetermined sequence for controlling said first and third magnetic switch means, and means operable in one position of said switch means for controlling the energization of said third magnetic switch means in accordance with the speed of said motor.

3. In combination, a D.C. motor having an armature and first and second field windings, first and second batteries, first control means for connecting said batteries in series or in parallel, second control means for connecting the field windings of said motor in series or in parallel, and manually operable control means controlling the operation of said first and second control means in a predetermined sequence, said control means being operative to connect said batteries in parallel and said field windings in series in one position of said manually operable control means, said manually operable control means causing said batteries to be connected in parallel and said field windings in parallel in a second position of said manually operable control means, said manually operable control means having a third position wherein said batteries are connected in series and said field windings are connected in series and having a fourth position wherein said batteries are connected in series and said field windings in parallel and means responsive to the speed of said motor for connecting said field windings in series and with said source of direct current power when said motor speed is above a predetermined value and for connecting said motor field windings in parallel and with said source of direct current when said motor speed is below a predetermined value, said last-named means being operative only in said fourth position of said manually operable control means.

4. The combination including, a D.C. motor having an armature and first and second field windings, first and second batteries, first control means for connecting said batteries in series or in parallel, second control means for connecting said field windings in series or in parallel, and manually operable control means for controlling the operation of said first and second control means, said first and second control means being set to connect said batteries in parallel and said field windings in series in a first position of said manually operable control means, said first and second control means being set to connect said batteries in parallel and said field windings in parallel in a second position of said manually operable control means, said first and second control means being set to connect said batteries in series and said field windings in series in a third position of said manually operable control means, said first and second control means being set to connect said batteries in series and said field windings in parallel in a fourth position of said manually operable control means, and means for changing the connections of said field windings in accordance with motor speed when said manually operable control means is in its said fourth position.

5. The combination according to claim 4 wherein the first and second control means include magnetic switches.

6. The combination according to claim 4 wherein a third control means is provided for controlling the direction of current flow through the armature of the D.C. motor so as to control its direction of rotation.

7. In combination, a D.C. motor having first and second field windings and an armature, a source of direct current power, magnetic switch means for controlling the connection of said field windings in series or in parallel, manually operable switch means for controlling said magnetic switch means, and means responsive to motor speed for controlling the connection of said motor field windings in series or in parallel in one position of said manually operable control means.

8. In combination, a D.C. motor having first and second field windings and an armature, a source of direct current power, first control means for connecting said field windings in series or in parallel, manually operable control means for controlling the operation of said first control means, and centrifugal switch means driven by said motor for controlling the connection of said motor field windings in series or in parallel in one position of said manually operable control means.

9. A motor control system for providing four output speeds and a starting speed comprising, a D.C. motor having an armature and first and second field windings, first and second batteries, means including manually operable control means for setting the starting speed and said first, second, third and fourth output speeds, a resistor having a positive temperature coefficient of resistance, said control means in its start position causing said batteries to be connected in parallel and connecting said motor field windings in series through said resistor, said control means in said first output speed position causing said batteries to be connected in parallel and said motor field windings in series, said control means in said second output speed position causing said batteries to be connected in parallel and said motor field windings in parallel, said control means in its third output speed position causing said batteries to be connected in series and said motor field windings in series, said control means in its fourth output speed position causing said batteries to be connected in series and said motor field windings in parallel.

References Cited by the Examiner

UNITED STATES PATENTS

| | | | |
|---|---|---|---|
| 1,110,821 | 9/1914 | Radley | 318—139 |
| 2,558,032 | 6/1951 | Andrews | 318—472 |
| 2,832,926 | 4/1958 | Walley | 318—472 |
| 3,134,063 | 5/1964 | Hastings | 318—139 |

ORIS L. RADER, *Primary Examiner.*

S. GORDON, *Assistant Examiner.*